(12) United States Patent
Farrugia et al.

(10) Patent No.: US 8,886,947 B2
(45) Date of Patent: Nov. 11, 2014

(54) OPTIMIZED INTEGRITY VERIFICATION PROCEDURES

(71) Applicant: Apple Inc., Cupertino, CA (US)

(72) Inventors: Augustin J. Farrugia, Cupertino, CA (US); Melanie Riendeau, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/723,097

(22) Filed: Dec. 20, 2012

(65) Prior Publication Data

US 2013/0145167 A1      Jun. 6, 2013

Related U.S. Application Data

(63) Continuation of application No. 11/377,082, filed on Mar. 15, 2006, now Pat. No. 8,364,965.

(51) Int. Cl.
*H04L 9/32*     (2006.01)
*G06F 21/64*    (2013.01)

(52) U.S. Cl.
CPC .................................... *G06F 21/64* (2013.01)
USPC ............. 713/176; 713/165; 713/189; 380/28; 380/37; 380/46; 705/1.1

(58) Field of Classification Search
CPC ...... G06F 21/64; H04L 9/3247; H04L 9/3281
USPC ...................... 713/165, 176–189; 726/26–30; 380/281, 26, 46; 705/1.1
See application file for complete search history.

(56) References Cited

U.S. PATENT DOCUMENTS

| | | | |
|---|---|---|---|
| 5,113,444 A | * | 5/1992 | Vobach ............................ 380/47 |
| 5,193,115 A | * | 3/1993 | Vobach ............................ 380/46 |
| 5,454,000 A | | 9/1995 | Dorfman |
| 5,625,693 A | | 4/1997 | Rohatgi et al. |
| 5,673,316 A | | 9/1997 | Auerbach et al. |
| 5,913,022 A | | 6/1999 | Tinaztepe et al. |

(Continued)

FOREIGN PATENT DOCUMENTS

| | | |
|---|---|---|
| AU | 2004275264 | 3/2005 |
| AU | 2009233685 | 11/2009 |

(Continued)

OTHER PUBLICATIONS

International Search Report and Written Opinion for PCT/US2004/029470, Dec. 27, 2005 (Issuance date), Apple Inc.

(Continued)

*Primary Examiner* — Dede Zecher
*Assistant Examiner* — Viral Lakhia
(74) *Attorney, Agent, or Firm* — Adeli LLP

(57) ABSTRACT

Some embodiments of the invention provide a method of verifying the integrity of digital content. At a source of the digital content, the method generates a signature for the digital content by applying a hashing function to a particular portion of the digital content, where the particular portion is less than the entire digital content. The method supplies the signature and the digital content to a device. At the device, the method applies the hashing function to the particular portion of the digital content in order to verify the supplied signature, and thereby verifies the integrity of the supplied digital content.

19 Claims, 6 Drawing Sheets

(56) References Cited

U.S. PATENT DOCUMENTS

| | | | |
|---|---|---|---|
| 6,092,147 | A | 7/2000 | Levy et al. |
| 6,202,203 | B1 | 3/2001 | Ng |
| 6,263,348 | B1 | 7/2001 | Kathrow et al. |
| 6,324,637 | B1 | 11/2001 | Hamilton |
| 6,560,706 | B1 | 5/2003 | Carbajal et al. |
| 6,591,365 | B1 | 7/2003 | Cookson |
| 6,658,556 | B1 | 12/2003 | Arimilli et al. |
| 6,785,815 | B1 | 8/2004 | Serret-Avila et al. |
| 6,792,535 | B1 * | 9/2004 | Kwan .................. 713/176 |
| 6,954,747 | B1 | 10/2005 | Wang et al. |
| 6,959,384 | B1 | 10/2005 | Serret-Avila |
| 6,986,046 | B1 | 1/2006 | Tuvell et al. |
| 7,003,107 | B2 * | 2/2006 | Ananth .................. 380/37 |
| 7,103,779 | B2 | 9/2006 | Kiehtreiber et al. |
| 7,246,098 | B1 | 7/2007 | Walmsley |
| 7,343,491 | B2 * | 3/2008 | Nakano .................. 713/171 |
| 7,346,163 | B2 | 3/2008 | Pedlow, Jr. et al. |
| 7,356,815 | B2 | 4/2008 | Sarfati et al. |
| 7,395,426 | B2 | 7/2008 | Lee et al. |
| 7,406,603 | B1 | 7/2008 | MacKay et al. |
| 7,430,670 | B1 | 9/2008 | Horning et al. |
| 7,461,406 | B2 * | 12/2008 | Pelly et al. .................. 726/27 |
| 7,478,432 | B2 | 1/2009 | Echizen et al. |
| 7,484,103 | B2 | 1/2009 | Woo et al. |
| 7,529,929 | B2 | 5/2009 | Asokan et al. |
| 7,539,691 | B2 | 5/2009 | Wortendyke et al. |
| 7,543,336 | B2 | 6/2009 | Lampson et al. |
| 7,568,102 | B2 | 7/2009 | Liu et al. |
| 7,594,261 | B2 * | 9/2009 | Lauter et al. .................. 726/14 |
| 7,650,504 | B2 | 1/2010 | Bodrov |
| 7,664,728 | B2 | 2/2010 | Wortendyke et al. |
| 7,729,495 | B2 | 6/2010 | Lee et al. |
| 7,747,876 | B2 | 6/2010 | Oxford |
| 7,752,447 | B2 * | 7/2010 | Kazami .................. 713/176 |
| 8,055,910 | B2 * | 11/2011 | Kocher et al. .................. 713/193 |
| 8,108,313 | B2 | 1/2012 | Raley et al. |
| 8,127,140 | B2 * | 2/2012 | Teranishi .................. 713/180 |
| 8,341,422 | B2 | 12/2012 | Kiehtreiber et al. |
| 8,364,965 | B2 | 1/2013 | Farrugia et al. |
| 2001/0034839 | A1 | 10/2001 | Karjoth et al. |
| 2002/0013799 | A1 | 1/2002 | Blaker |
| 2002/0039419 | A1 * | 4/2002 | Akimoto et al. .................. 380/243 |
| 2002/0059425 | A1 | 5/2002 | Belfiore et al. |
| 2002/0085710 | A1 * | 7/2002 | Ananth .................. 380/37 |
| 2002/0184046 | A1 | 12/2002 | Kamada et al. |
| 2002/0194484 | A1 | 12/2002 | Bolosky et al. |
| 2003/0084298 | A1 * | 5/2003 | Messerges et al. .................. 713/176 |
| 2003/0131239 | A1 | 7/2003 | Greene et al. |
| 2003/0185395 | A1 | 10/2003 | Lee et al. |
| 2003/0196110 | A1 | 10/2003 | Lampson et al. |
| 2004/0030909 | A1 | 2/2004 | Sako et al. |
| 2004/0064457 | A1 | 4/2004 | Zimmer et al. |
| 2004/0098599 | A1 | 5/2004 | Bentley |
| 2004/0196975 | A1 | 10/2004 | Zhu et al. |
| 2004/0255114 | A1 | 12/2004 | Lee et al. |
| 2004/0255123 | A1 | 12/2004 | Noyama et al. |
| 2004/0255165 | A1 | 12/2004 | Szor |
| 2004/0255268 | A1 | 12/2004 | Meijer et al. |
| 2005/0005112 | A1 | 1/2005 | Someren |
| 2005/0038999 | A1 * | 2/2005 | Pelly .................. 713/165 |
| 2005/0071274 | A1 | 3/2005 | Pfaff et al. |
| 2005/0089160 | A1 * | 4/2005 | Crispin et al. .................. 380/28 |
| 2005/0166264 | A1 | 7/2005 | Yamada et al. |
| 2005/0277403 | A1 | 12/2005 | Schmidt et al. |
| 2006/0227364 | A1 * | 10/2006 | Frank et al. .................. 358/1.15 |
| 2006/0259781 | A1 * | 11/2006 | Saeki et al. .................. 713/189 |
| 2007/0234070 | A1 | 10/2007 | Horning et al. |
| 2013/0111216 | A1 | 5/2013 | Kiehtreiber et al. |

FOREIGN PATENT DOCUMENTS

| | | |
|---|---|---|
| CA | 2632076 | 3/2005 |
| CA | 2531363 | 3/2009 |
| CN | 1146122 | 3/1997 |
| CN | 1150762 C | 5/2004 |
| EP | 0328232 | 5/1995 |
| EP | 0752786 | 1/1997 |
| EP | 1496419 | 1/2005 |
| EP | 1695169 | 8/2006 |
| EP | 1835432 | 9/2007 |
| EP | 2284754 | 2/2011 |
| EP | 2284755 | 2/2011 |
| EP | 2634959 | 9/2013 |
| EP | 2634960 | 9/2013 |
| JP | H10-040100 | 2/1998 |
| JP | H10-282882 | 10/1998 |
| JP | 2001-034470 | 2/2001 |
| JP | 2001-147826 | 5/2001 |
| JP | 2001-147898 | 5/2001 |
| JP | 2002-353960 | 12/2002 |
| JP | 2003-202929 | 7/2003 |
| JP | 2003-524252 | 8/2003 |
| JP | 2004-514214 | 5/2004 |
| WO | WO 98/26535 | 6/1998 |
| WO | WO 00/49764 | 8/2000 |
| WO | WO 01/10076 | 2/2001 |
| WO | WO 01/63385 | 8/2001 |
| WO | WO 02/41147 | 5/2002 |
| WO | WO 2004/032328 | 4/2004 |
| WO | WO 2005/029223 | 3/2005 |
| WO | WO 2005/096119 | 10/2005 |
| WO | WO 2006/083015 | 8/2006 |
| WO | WO 2007/106831 | 9/2007 |

OTHER PUBLICATIONS

International Preliminary Report on Patentability and Written Opinion for PCT/US2004/029470, Mar. 21, 2006 (Issuance date), Apple Inc.
International Search Report for PCT/US2007/063919, Aug. 9, 2007 (Mailing date), Apple Inc.
Written Opinion for PCT/US2007/063919, Sep. 15, 2008 (Issuance date), Apple Inc.
International Preliminary Report on Patentability and Written Opinion for PCT/US2007/063919, Sep. 16, 2008 (Issuance date), Apple Inc.
Portions of prosecution history of AU2004275264, Nov. 5, 2009 (mailing date), Apple Inc.
Portions of prosecution history of AU2009233685, Aug. 11, 2011 (mailing date), Apple Inc.
Portions of prosecution history of CA2531363, Jul. 8, 2008 (mailing date), Apple Inc.
Portions of prosecution history of CA2632076, Jan. 15, 2014 (mailing date), Apple Inc.
Portions of prosecution history of EP04783639.0, Oct. 4, 2011 (mailing date), Apple Inc.
Portions of prosecution history of EP13169962.1, Sep. 10, 2013 (mailing date), Apple Inc.
Portions of prosecution history of EP13169965.4, Sep. 12, 2013 (mailing date), Apple Inc.
Portions of prosecution history of EP07104227.9, Jan. 2, 2014 (mailing date), Apple Inc.
Portions of prosecution history of EP10183083.4, Aug. 9, 2012 (mailing date), Apple Inc.
Portions of prosecution history of EP10183093.3, Aug. 9, 2012 (mailing date), Apple Inc.
Bellare, M., et al., "Incremental Cryptography: The Case of Hashing and Signing," Advances in Cryptology (Crypto), Proceedings of the Annual International Cryptology Conference, Aug. 21-25, 1994, pp. 1-19, Santa Barbara, CA.
Garfinkel, Simson, et al., Web Security, Privacy & Commerce, 2nd Edition, Jan. 2002, 5 pages, O'Reilly Media, Inc., USA.
Schneier, Bruce, Applied Cryptography: Protocols, Algorithms, and Source Code in C, Second Edition, Nov. 1995, Section 18.7, 6 pages, John Wiley & Sons, Inc., USA.
Simha, Rahul, et al., Overview of security-driven compilation, Nov. 4, 2004, GWU, 5 pages.

\* cited by examiner

OPTIMIZED INTEGRITY VERIFICATION PROCEDURES

CLAIM OF BENEFIT TO PRIOR APPLICATIONS

This application is a continuation application of U.S. patent application Ser. No. 11/377,082, filed Mar. 15, 2006, now published as U.S. Publication 2007/0220261, which is incorporated herein by reference.

FIELD OF THE INVENTION

The present invention relates to optimized integrity verification procedures.

BACKGROUND OF THE INVENTION

The protection of digital content transferred between computers over a network is fundamentally important for many enterprises today. Enterprises attempt to secure this protection by implementing some form of Digital Rights Management (DRM) process. The DRM process often involves encrypting the piece of content (e.g., encrypting the binary form of the content) to restrict usage to those who have been granted a right to the content.

Cryptography is the traditional method of protecting digital content, such as data in transit across a network. In its typical application, cryptography protects digital content between two mutually trusting parties from thievery by attack on the data in transit. However, for many digital file transfer applications today (e.g., for the transfer of audio or video content), the paradigm has shifted, as a party that receives the content (i.e. the "receiving party") might try to break the DRM encryption that the party that supplied the content (i.e., the "distributing party") applied to the content. In addition, with the proliferation of network penetration attacks, a third party may obtain access to the receiving party's computer and thus to the protected content.

In addition to the encryption and decryption, digital content may need other layers of protection. Authentication is another important layer of protection. When receiving digital content, the receiver often needs to "authenticate" the source of the digital content. In other words, the receiver needs to verify the integrity of the digital content by ensuring that the content came from an authenticated source and was not tampered on its way to the receiver.

To date, several processes for authenticating the integrity of digital content have been proposed. These processes typically apply a hashing function to the plaintext version of the content in order to produce a hash digest (also called a hash or a digest), which is then used to produce a signature for the content. A fundamental property of all hash functions is that if two hashes are different, then the two inputs were different in some way. When two hashes are identical for the different inputs, it is a hash collision. It is the important in a cryptographic system that the hash function has a very low collision probability.

Traditional integrity verification processes are computationally intensive, especially for portable devices with limited computational resources. Therefore, there is a need in the art for an integrity verification process that is less computationally intensive. Ideally, such a process would allow a portable device to quickly verify the integrity of digital content it receives.

SUMMARY OF THE INVENTION

Some embodiments of the invention provide a method of verifying the integrity digital content. At a source of the digital content, the method generates a signature for the digital content by applying a hashing function to a particular portion of the digital content, where the particular portion is less than the entire digital content. The method supplies the signature and the digital content to a device. At the device, the method applies the hashing function to the particular portion of the digital content in order to verify the integrity the supplied signature, and thereby verify the integrity of the supplied digital content.

The particular portion of the digital content includes several different sections of the digital content. In some embodiments, the method configures the source and the device to select a predetermined set of sections of the digital content as the particular portion of the digital content. The device in some embodiments includes a read-only memory that (1) stores code for identifying the particular potion, and (2) stores the hashing function.

In some embodiments, the method generates a signature for the digital content at the source by (1) applying the hashing function to the particular portion to generate a hash digest, and then (2) generating the signature from the hash digest. The method can be implemented in either an asymmetric or symmetric integrity verification process. For instance, in some embodiments, the method applies the hashing function at the device by (1) applying the hashing function to the particular portion to generate a hash digest, and (2) supplying the digest and the received signature to a signature verifying process that determines the authenticity of the signature based on the supplied digest. Alternatively, in some embodiments, the method applies the hashing function at the device by (1) generating a second signature based on the hash digest, and (2) comparing first and second signatures to determine the integrity of the supplied digital content.

The source of the digital content can be different in different embodiments. For instance, the source can be the content's author, distributor, etc. The device that receives the digital content can also be different in different embodiments. Several examples of such a device include a portable audio/video player (e.g., iPod), a laptop, a mobile phone, etc. The digital content can also be different in different embodiments. For example, the digital content can be firmware updates to the operating system of the device, third-party applications for operating on the device, audio/video files for playing on the device, etc.

BRIEF DESCRIPTION OF THE DRAWINGS

The novel features of the invention are set forth in the appended claims. However, for purpose of explanation, several embodiments are set forth in the following figures.

DETAILED DESCRIPTION OF THE INVENTION

Figure 1:
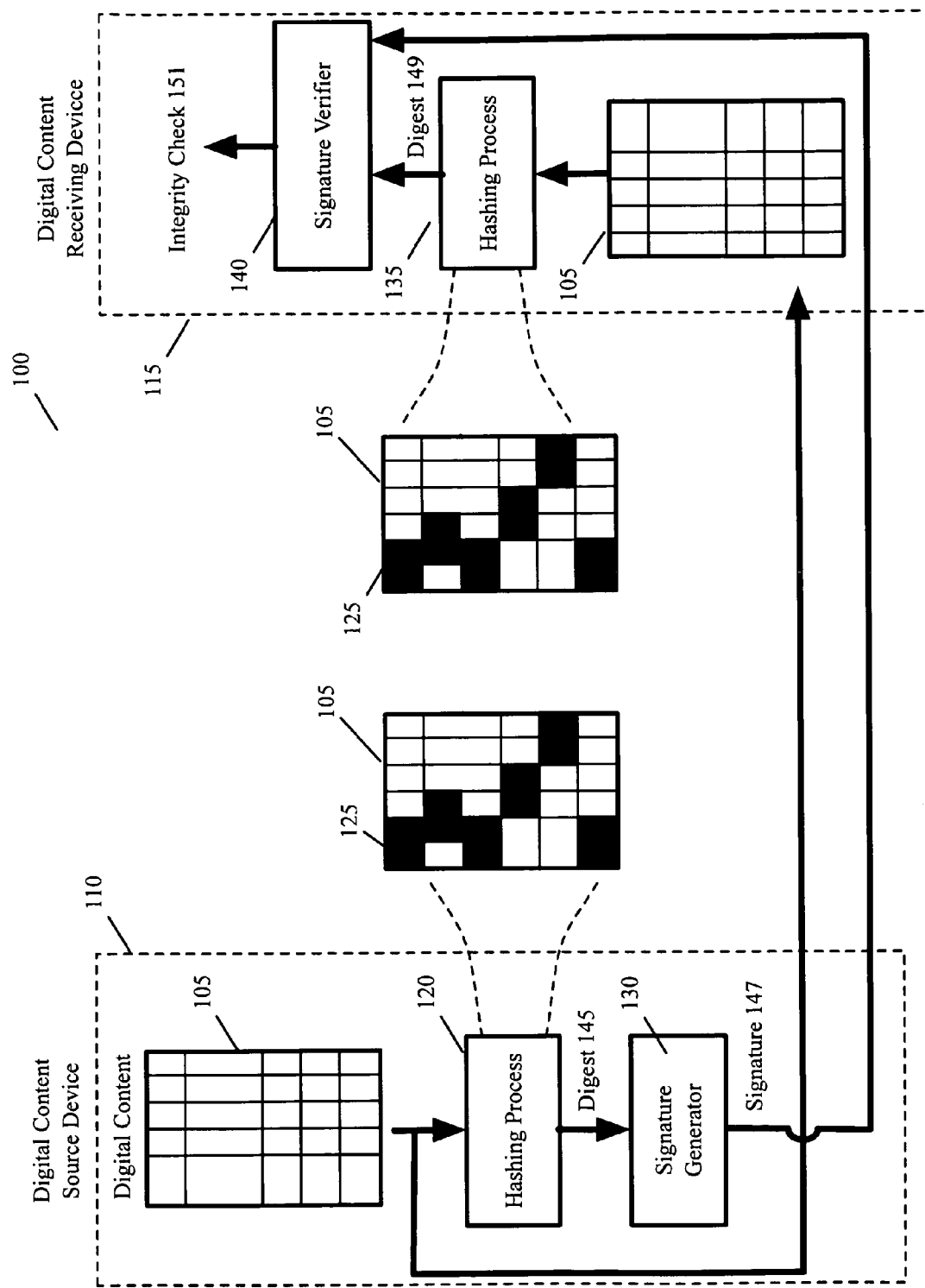
FIG. 1 illustrates an integrity verification system of some embodiments of the invention.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Overview

Some embodiments of the invention provide a method of verifying the integrity digital content. At a source of the digital content, the method generates a signature for the digital content by applying a hashing function to a particular portion of the digital content, where the particular portion is less than the entire digital content. The method supplies the signature and the digital content to a device. At the device, the method applies the hashing function to the particular portion of the digital content in order to verify the integrity the supplied signature, and thereby verify the integrity of the supplied digital content.

The particular portion of the digital content includes several different sections of the digital content. In some embodiments, the method configures the source and the device to select a predetermined set of sections of the digital content as the particular portion of the digital content. The device in some embodiments includes a read-only memory that (1) stores code for identifying the particular potion, and (2) stores the hashing function.

In some embodiments, the method generates a signature for the digital content at the source by (1) applying the hashing function to the particular portion to generate a hash digest, and then (2) generating the signature from the hash digest. The method can be implemented in either an asymmetric or symmetric integrity verification process. For instance, in some embodiments, the method applies the hashing function at the device by (1) applying the hashing function to the particular portion to generate a hash digest, and (2) supplying the digest and the received signature to a signature verifying process that determines the authenticity of the signature based on the supplied digest. Alternatively, in some embodiments, the method applies the hashing function at the device by (1) generating a second signature based on the hash digest, and (2) comparing first and second signatures to determine the integrity of the supplied digital content.

The source of the digital content can be different in different embodiments. For instance, the source can be the content's author, distributor, etc. The device that receives the digital content can also be different in different embodiments. Several examples of such a device include a portable audio/video player (e.g., iPod), a laptop, a mobile phone, etc. The digital content can also be different in different embodiments. For example, the digital content can be firmware updates to the operating system of the device, third-party applications for operating on the device, audio/video files for playing on the device, etc.

II. Integrity Verification Systems of Some Embodiments

FIG. 1 conceptually illustrates a more detailed version of an integrity verification system 100 of some embodiment of the invention. As shown in this figure, this system includes a content source device 110 and a content receiving device 115. As shown in FIG. 1, the content source device 110 supplies at least one piece of digital content 105 to the content receiving device 115. A content source is any party involved in the content's creation, sale or distribution. Examples of such a party include the content's author, seller, distributor, etc. The content source device 110 can be a set of one or more stationary or portable devices, computers, servers, etc.

As shown in FIG. 1, the content source device 110 performs a hashing process 120 and a signature generation process 130. The hashing process 120 applies a hash function to only a portion of the digital content 105. This portion is a particular pattern of bits 125 that are conceptually shown as blacked out sections of the digital content 105 in FIG. 1.

In some embodiments, this bit pattern is specified in a manner (e.g., by the content source device 110, by a DRM server that directs the device 110, etc.) that ensures that enough of the digital content is hashed to achieve three objectives. First, the bit pattern should be specified so that any tampering with the digital content will require tampering of one of the sections that are hashed, which would make the tampering apparent as tampering would change the eventual signature. Second, the bit pattern should be specified so that two different pieces of digital content hashed by the process 120 do not collide (i.e., do not produce the same hash). Third, as the content receiving device 115 will use the same bit pattern for its hashing process, the bit pattern should use the smallest amount of bits that achieve the first two objective, so that the hashing process will minimally use the computational resources of the content receiving device 115.

The hashing process 120 is configured to select the bit pattern 125 pseduo-randomly in some embodiments, or systematically (e.g., based on an ordered pattern of bytes) in other embodiments. For instance, in some embodiments, the digital content can be object code for a program (such as the operating system of the content receiving device 115, a third party application that runs on the content receiving device 115, etc.).

In some of these embodiments, the code includes a set of opcodes (i.e., instruction codes) and zero or more operands (i.e., zero or more pieces of data) for each opcode. Accordingly, some of these embodiments apply the hash function to as much of the opcodes and operands to maximize detection of tampering, to minimize hash collisions, and to minimize use of computational resources.

For instance, in some embodiments, the content receiving device uses an ARM microprocessor. In such a microprocessor, every line of object code (that includes an opcode and its associated operand) is called a microprocessor operation unit (MOU), which has a four-byte statistical length. Hence, some embodiments use the four-byte width to identify the boundary between each line of code, and then use this knowledge to select one or more bytes between each MOU. The selection of the byte among the MOU may have different implementations in different embodiments. Some embodiments include a pseudo random mix of opcodes and operands in the bit pattern that needs to be hashed. Other embodiments might only include opcodes (e.g., most or all opcodes) in a piece of code that is being hashed and signed. Yet other embodiments may select a determined byte (e.g., always the first one) in each line of instructions. Some embodiments use a secret function that, for each MOU, produces an integer modulus of the MOU length and then select the section or sections in the MOU that correspond to this modulus. Other embodiments might use other microprocessors, such as microprocessors provided by Motorola Corporation, Intel Corporation, AMD Corporation, IBM Corporation, etc.

In different embodiments, the hashing process 120 applies a different hashing function to the particular portion of the digital content. Examples of hashing functions that are used in different embodiments include MD5, SHA-1, etc. Hashing functions may be used with or without a key (i.e., hashing functions may be keyed hashing functions).

As mentioned above, a hashing function is a transformation that typically takes some form (e.g., a plaintext form) of content and transforms it into a scrambled output called the digest or hash. The digest typically has a fixed-size set of bits that serves as a unique "digital fingerprint" for the original content. If the original message is changed and hashed again, it has a very high probability of producing a different digest. Thus, hash functions can be used to detect altered and forged documents. They provide message integrity, assuring a content recipient that the content has not been altered or corrupted.

As shown in FIG. 1, the signature generator 130 receives the digest that the hashing function. of the hashing process 120 produces. The signature generator 130 produces a signature 147 for the content 105 from the received digest 145. To produce such a signature, the generator 130 can use any one of a number of known techniques such as: SHA-1, MD5 MAC.

In the system 100, the digital content 105 and the generated signature 147 are supplied to the content receiving device 115 as shown in FIG. 1. Different embodiments supply this data to the receiving device 115 differently. For instance, some embodiments distribute this data through a communication network, such a local area network, a wide are network, or a network of networks (e.g., the Internet). Furthermore, through a network, the content receiving device 115 can receive this data directly from the creator, seller, or distributor of the content, or indirectly through one or more intervening servers, such as one or more DRM servers, content caching servers, etc.

A content recipient is any party involved in the content's use or distribution of content. Examples of such a party include the content's user, distributor, etc. The content receiving device 115 can be a stationary or portable device, computer, server, audio/video player, a communication device (e.g., phone, pager, text messenger, etc.), organizer, etc.

In the system 100, the content source device 110 and the content receiving device 115 employ an asymmetric integrity verification process. Accordingly, the content receiving device 115 performs two processes, a hashing process 135 and a signature-verification process 140.

The hashing process 135 applies the same hash function to the same sections of the digital content 105 as the hashing process 120 of the content source device 110. Specifically, in some embodiments, the hashing process 135 of the receiving device 115 is configured to select the same bit patterns in the digital content 105 as the hashing process 120 of the content source device 110. FIG. 1 illustrates this conceptually by showing that the hashing processes 120 and 135 use identical blacked-out bit patterns 125 in the digital content 105. The hashing process 135 selection of the same bit pattern 125 might be done through a pseduo-random or systematic manner that leads to the selection of the same bit pattern as the hashing process 120.

Applying the hashing function of the hashing process 135 to the content 105 produces a digest 149. This digest should be identical to the digest 145 produced by the hashing function of the hashing process 120 when the digital content received by the processes 120 and 135 are the same, as both processes select the same set of sections in the digital content.

As shown in FIG. 1, the signature verifier 140 receives the digest 149 that the hashing function of the hashing process 135 produces. The signature verifier 140 also receives the signature 147 produced by the signature generator 130 of the content source device 110. The verifier 140 then determines whether the received signature 147 is the correct signature for the received digital content 105, by ensuring that the signature 147 is appropriate for the digest 149. To ensure that the signature 147 is appropriate for the digest 149, the verifier 140 can use any one of a number of known techniques, such as SHA-1 or MD5.

Based on its comparison of the digest 149 and the signature 147, the signature verifier 140 then outputs an integrity check value 151. This value specifies whether the received signature 147 is the appropriate signature for the received digital content 105. For instance, in some embodiments, the integrity check value is a Boolean value, which is true when the digital content's integrity is verified (i.e., when the received signature matches the received digital content), and is false when the digital content's integrity is not verified. In other embodiments, the integrity check value is any other type of two-state value, with one state indicating that the digital content integrity is verified and the other state indicating that the digital content integrity is not verified. The integrity check will specify that the content integrity is not verified when one or more parts of the digital content are tampered after the signature 147 is generated and these parts include one or more content sections that are used to generate the hash digests 145 and 149.

Figure 2:
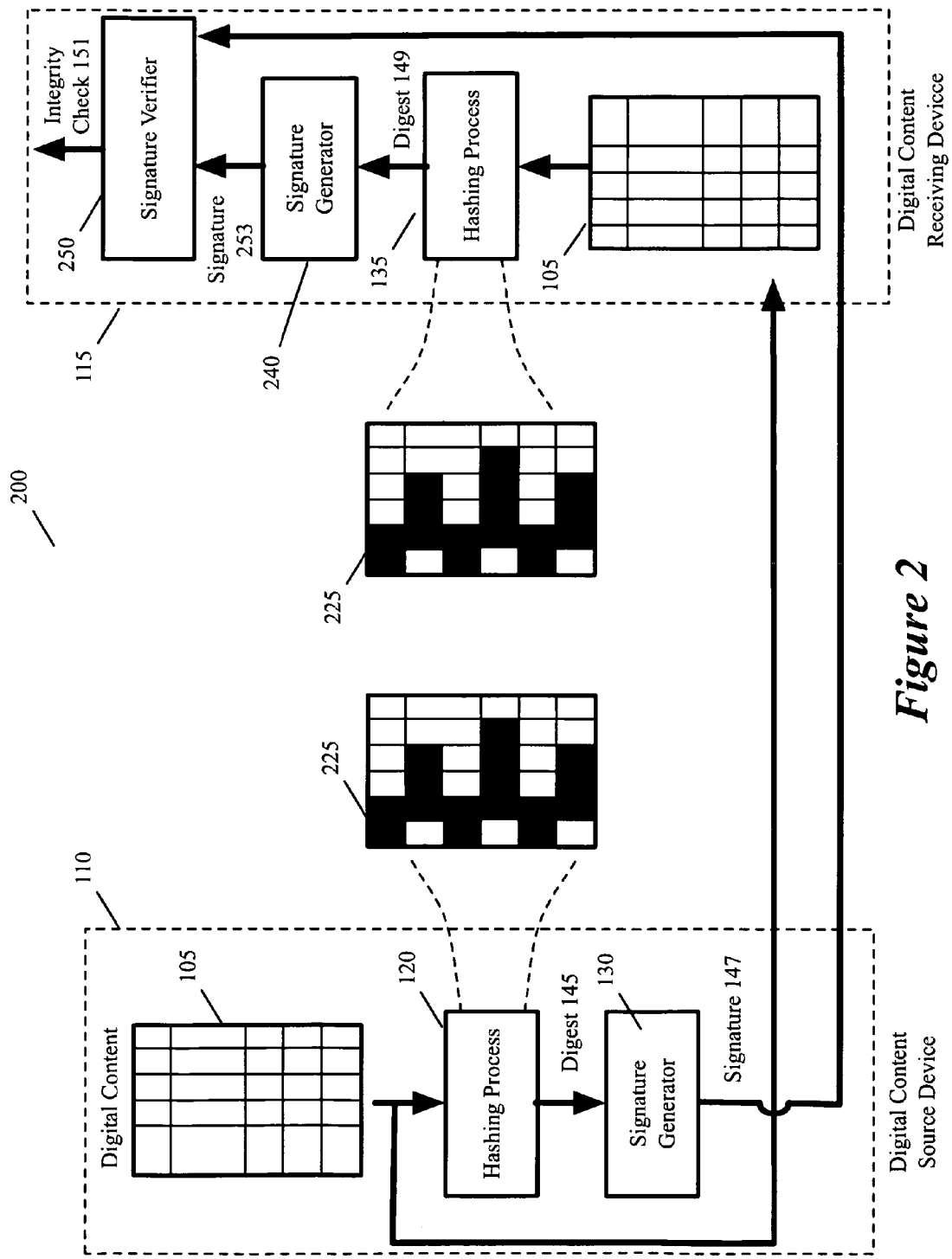
FIG. 2 illustrate another integrity verification system of some embodiments of the invention.

Other embodiments might be implemented in different integrity verification systems. For instance, FIG. 2 illustrates one implementation of the invention in a symmetric integrity verification system 200. The system 200 is similar to the system 100 except that its content receiving device 115 does not include the asymmetric signature verifier 140 but includes a signature generator 240 and a symmetric signature verifier 250.

Like the signature generator 130 of the content source device 110, the signature generator 240 generates a signature 253 from the hash digest 149 that it receives. The generated signature 253 is then supplied to the signature verifier 250 along with the received signature 147. The verifier 250 then compares the two signatures to specify its integrity check value 151. The integrity check value 151 indicates that the received digital content has not been tampered when the two signatures 147 and 253 match. When these two signatures do not match, the integrity check value indicates that the content has been tampered (i.e., the received signature 147 does not correspond to the received digital content).

To conceptually illustrate that different portions of the digital content can be hashed in different embodiments or for different pieces of content, FIG. 2 illustrates a different blacked-out bit pattern 225 in the content 105 than the pattern illustrated in FIG. 1. The sections blacked out in FIG. 2 have different lengths in order to conceptually illustrate that sections of different sizes can be hashed in some embodiments of the invention.

Figure 3:
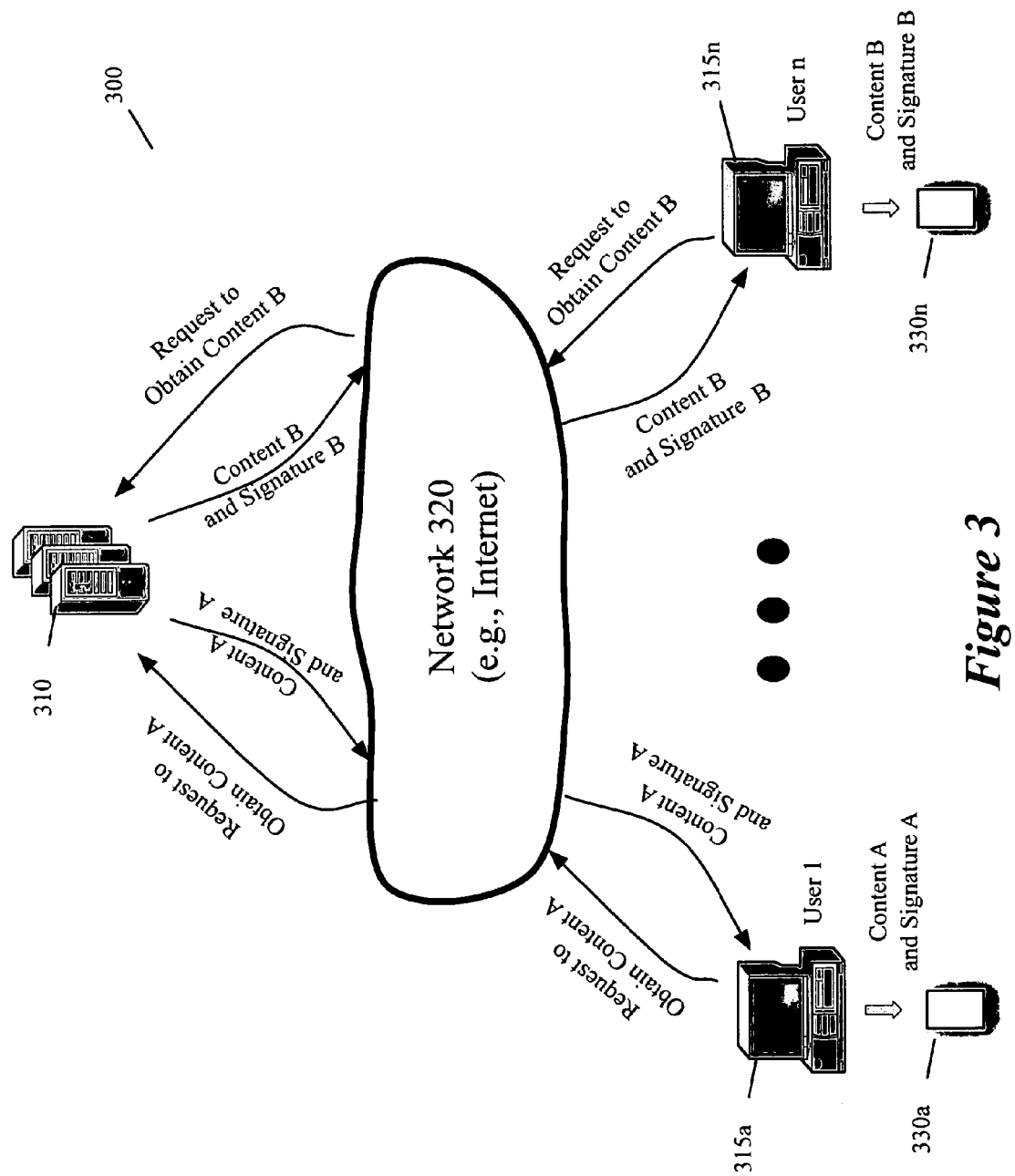
FIG. 3 illustrate a DRM system that implements the integrity verification system of some embodiments of the invention.

III. DRM System Implementing the Integrity Verification System of Some Embodiments The integrity verification system of some embodiments is implemented in a DRM system that distributes content in a manner that ensures the legal use of the content. As shown in FIG. 3, the DRM system 300 includes a set of DRM servers 310 that distribute content to a set of N user computers 315. The set of servers 310 connects to the user computers 315 through a computer network 320, such as a local area network, a wide area network, a network of networks (e.g., the Internet), etc. Each user computer 315 connects to a set of one or more portable multi-media devices 330.

Through the network connection, the user computers 315 communicate with the set of DRM servers 310 to purchase, license, update, or otherwise obtain content in some embodiments. Accordingly, while in some embodiments, the DRM server set 310 sells or licenses content to the user computers, this set in other embodiments does not sell or license the content. For instance, in some of embodiments, the DRM server set 310 simply enforces the distribution of content to authorized computers without having any financial objective.

In some embodiments, the DRM server set 310 includes a content caching server that provides encrypted content to a user computer 310 through the network 320, after another DRM server 310 determines that the computer 310 can obtain the content. In some embodiments, the system 300 uses multiple caching servers to cache content at various locations on the network, in order to improve the speed and efficiency of downloading content across the network.

As mentioned above, a user computer 315 communicates with the DRM server set 310 to purchase, license, update, or otherwise obtain content through the network 320. In some embodiments, the DRM server set 310 supplies a signature for a piece of content that it distributes to a user computer 315, where this signature is generated by hashing only a portion of the content, according to some embodiments of the invention.

Specifically, FIG. 3 illustrates a user computer 315a sending a request for a piece of content "A" to the DRM server set 310. This request can be a request to purchase, license, or otherwise obtain the content. Alternatively, when the content is an application or operating system running on the user computer or one of its associated multi-media devices 330, the request might be a request for an update to the application or operating system. This request might be an explicit request or an implicit request in an update checking process performed on the user computer 315, which with or without the user intervention checks for updates to the application or operating system.

Figure 4:
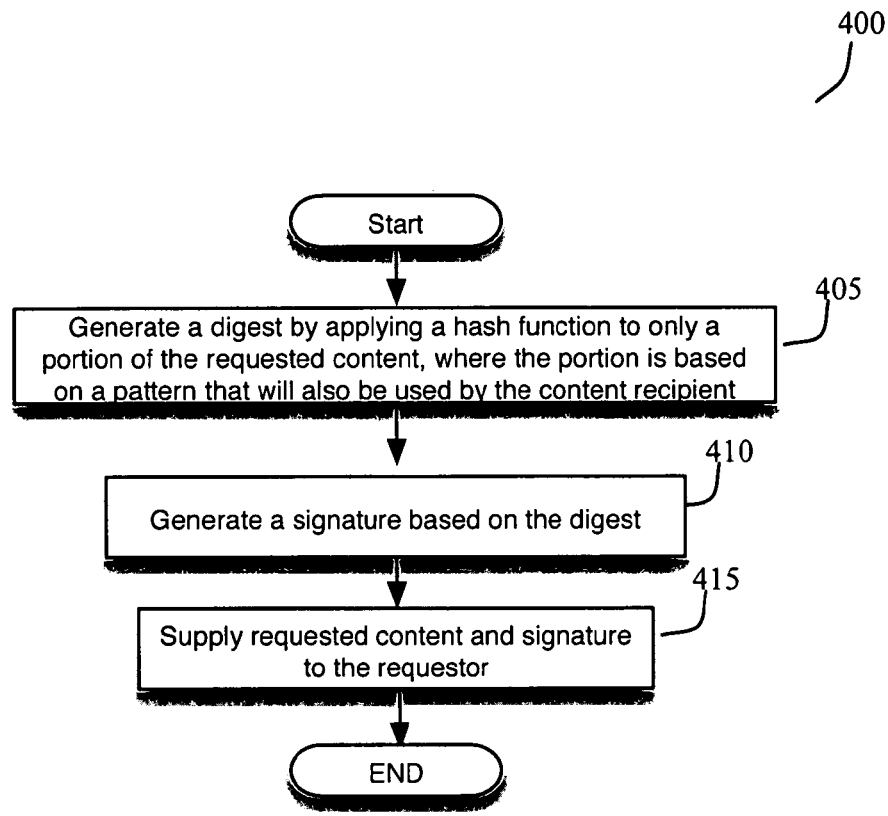
FIG. 4 illustrates an integrity verification process performed by one or more DRM servers in some embodiments of the invention.

As shown in FIG. 3, the DRM server set 310 receives the request for content A from the user computer 315a. One or more of the DRM computers then perform the process 400 illustrated in FIG. 4 to generate a signature for the requested content A. As shown in FIG. 4, the process 400 initially generates (at 405) a digest by applying a hash function to only a portion of the requested content A. Application of a hash function to only a portion of a piece of content was described in Sections I and II above. As mentioned above and further described below, the process 400 applies the hash function to the same portion of the content A as the hashing functions of the user computer 315a and its associated multi-media device 330a.

After applying the hashing function at 405, the process 410 generates (at 410) a signature based on the hash digest produced at 405. Generating a signature based on the hash digest was described above in Sections I and II. After generating the signature at 410, the process supplies the requested content A and its associated signature to the user computer 315a, and then ends.

In some embodiments, the user computer 315a uses the supplied signature to verify the integrity of the received content A. To do this, the user computer 315a would generate a hash digest for the content A by applying the hashing function to the same portion of the content A as the hashing function of the DRM server set 310. It then uses this hash digest to verify the integrity of the signature by using an asymmetric signature-verifying approach (such as the one illustrated in FIG. 1) or a symmetric signature-verifying approach (such as the one illustrated in FIG. 2).

In some embodiments, a multi-media device 330a of the user computer 315a also receives the content A and the signature A for this content when it synchronizes with the computer 315a. Accordingly, when the content A is content that is intended for the multi-media device 330a, the user computer 315a in some embodiments records (e.g., in a data storage) the need to download the content A and its signature to the device 330a when the device 330a synchronizes next with the computer 315a.

Like the user computer 315a, the multi-media device 330a generate a hash digest for the content A by applying the hashing function to the same portion of the content A as the hashing function of the DRM server set 310. It then uses this hash digest to verify the integrity of the content by using an asymmetric signature-verifying approach (such as the one illustrated in FIG. 1) or a symmetric signature-verifying approach (such as the one illustrated in FIG. 2).

Figure 5:
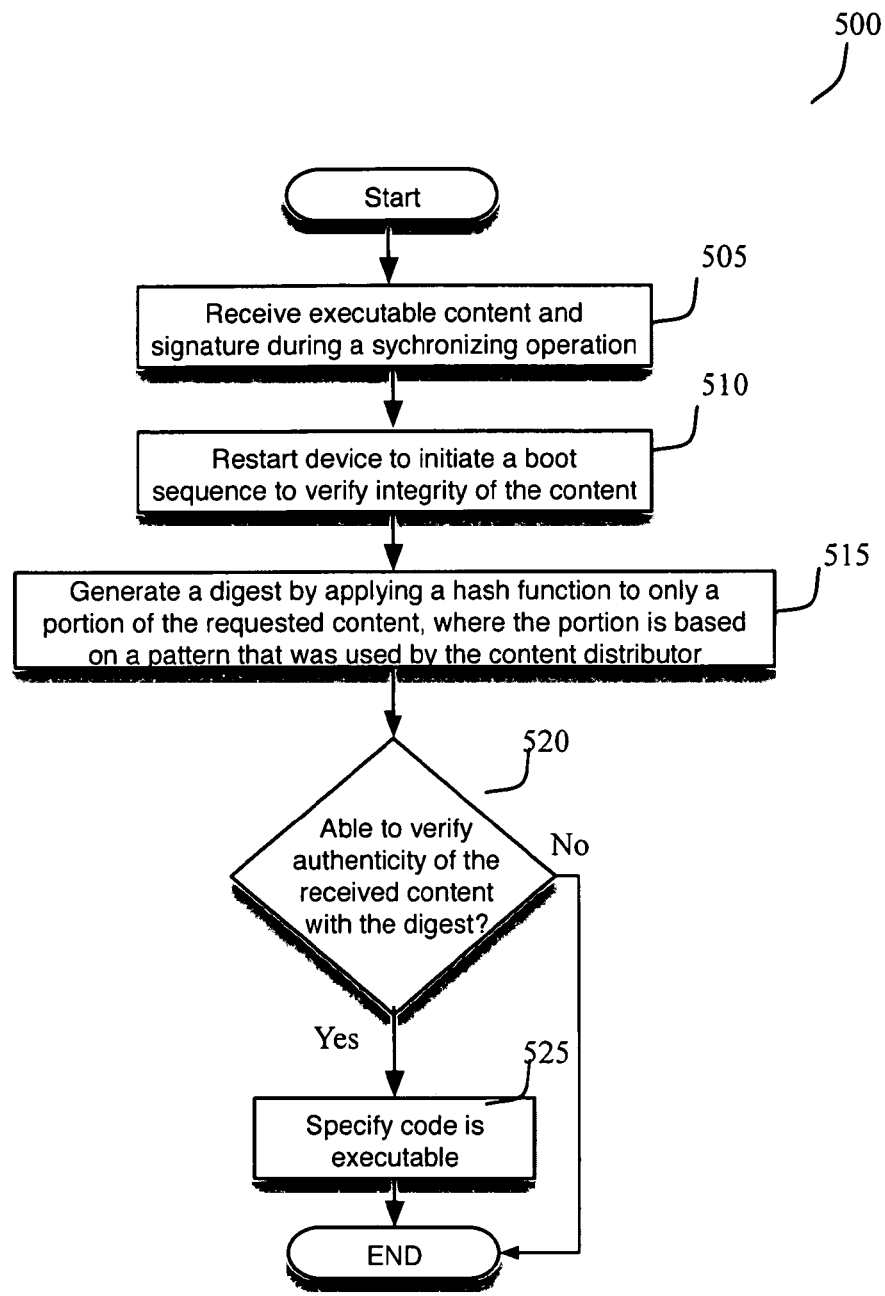
FIG. 5 illustrates an integrity verification process performed by a portable multi-media device of some embodiments of the invention.

FIG. 5 illustrates a more detailed example of the integrity verification process 500 that the multi-media device 330a performs in some embodiments. This process is performed during a synchronization operation that loads executable content (i.e., code for operating system updates, for updates to existing applications, for new applications, etc.) on the multi-media device 330a. As shown in this figure, the process 500 initially receives (at 505) executable content and signature for this content during a synchronization operation that ensures that the device has all the content that the user computer indicates that is should have.

After the synchronization, the process restarts (at 510) the device because, in some embodiments, the integrity verification process is part of the start-up boot sequence. Specifically, in some embodiments, the start-up boot sequence performs an integrity verification process for each piece of newly received code, even though in the example illustrated in FIG. 5, it is assumed that only one piece of content is loaded onto the device at 505. In some embodiments, the boot sequence (including the integrity verification process) are stores in a non-volatile read only memory of the device 315a. This ensures that integrity verification process cannot be tampered after the sale of the device.

Accordingly, during the start-up boot sequence, the process 500 generates (at 515) a hash digest for the received content by applying the hashing function to the same portion of the content as the hashing function of the DRM server set 310. It then uses (at 520) this hash digest to verify the integrity of the signature. For instance, the process 500 can use an asymmetric signature-verifying approach (such as the one illustrated in FIG. 1) or a symmetric signature-verifying approach (such as the one illustrated in FIG. 2).

When the process cannot verify (at 520) the integrity of the newly received code (i.e., when the newly received signature does not correspond to the digest generated by the device for the newly received content), the process ends without specifying that the content can be loaded in the executable memory. Alternatively, when the process verifies (at 520) the integrity of the newly received code, the process specifies (at 525) that the code is executable. In some embodiments, the process loads (at 525) the code in executable memory and executes the code.

The DRM system 300 of FIG. 3 has more than one user computer that receives digital content and signatures for such content according to the integrity verification procedures of some embodiments of the invention. Specifically, FIG. 3 illustrates a user computer 315n that requests a piece of content (i.e., content B) from the DRM server set 310. As shown in this figure, the user computer 315n receives the requested content B and a signature for this content from the DRM server set 310. According to the invention, the signature for content B is produced by hashing only a portion of the content B. The user computer 315n and its associated set of portable devices 330 then verify the integrity of the content B by hashing the same portion of content B as the DRM server set, in much the same manner as was described above for the user computer 315a and its associated devices 330a.

IV. System Diagram

Figure 6:
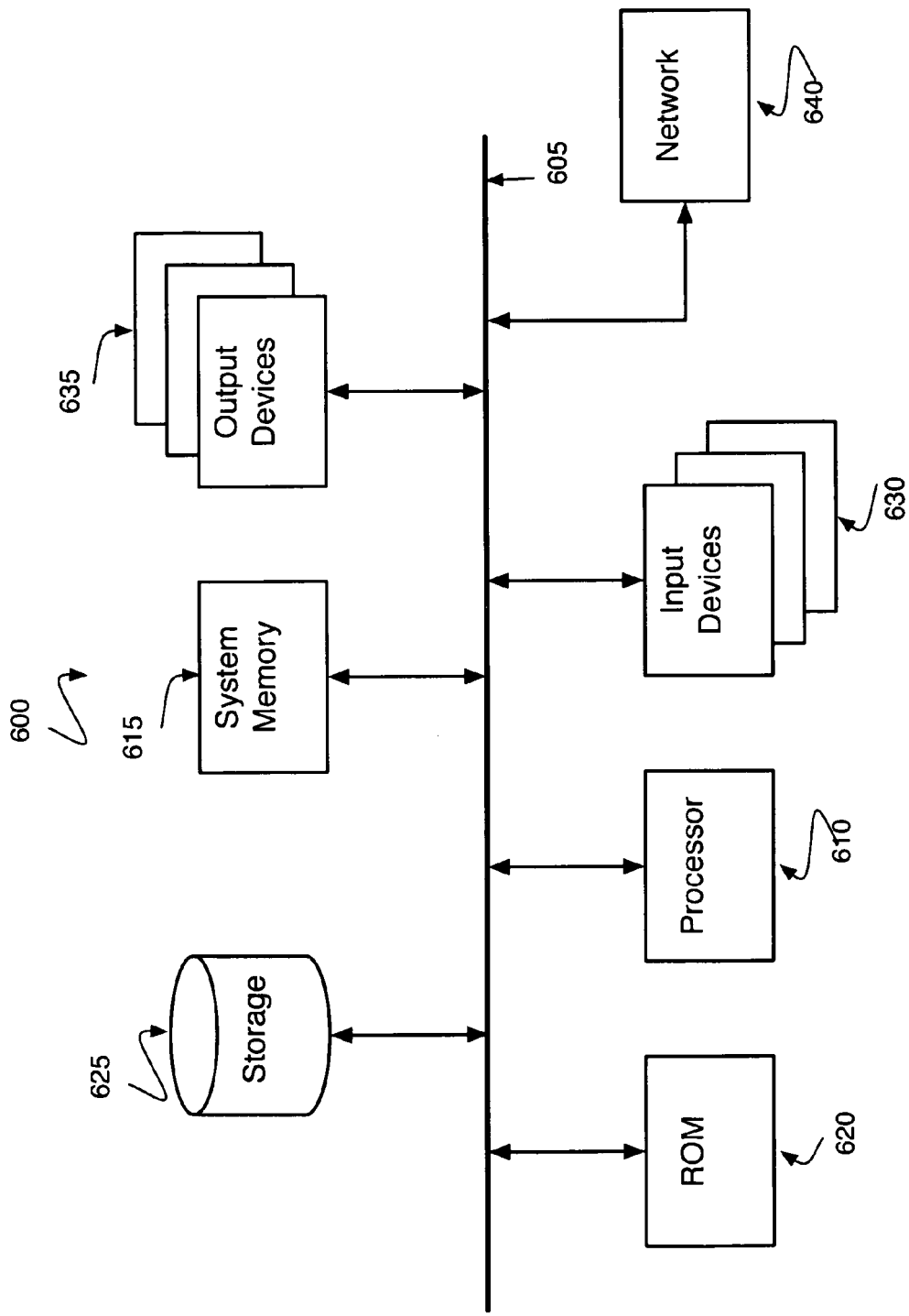
FIG. 6 presents a computer system diagram that conceptually illustrates the components of a typical DRM server, user computer, or portable device that implements some embodiments of the invention.

FIG. 6 presents a computer system diagram that conceptually illustrates the components of a typical DRM server, user computer, or portable device that implements some embodiments of the invention. Computer system 600 includes a bus 605, a processor 610, a system memory 615, a read-only memory 620, a permanent storage device 625, input devices 630, and output devices 3035.

The bus 605 collectively represents all system, peripheral, and chipset buses that support communication among internal devices of the computer system 600. For instance, the bus 605 communicatively connects the processor 610 with the read-only memory 620, the system memory 615, and the permanent storage device 625.

From these various memory units, the processor 610 retrieves instructions to execute and data to process in order to execute the processes of the invention. The read-only-memory (ROM) 620 stores static data and instructions that are needed by the processor 610 and other modules of the computer system. In case of a portable device that implements the invention, the read-only memory stores the boot up sequence and the hashing process of some embodiments, as mentioned above.

The permanent storage device 625, on the other hand, is a read-and-write memory device. This device is a non-volatile memory unit that stores instruction and data even when the computer system 600 is off. Some embodiments of the invention use a mass-storage device (such as a magnetic or optical disk and its corresponding disk drive) as the permanent storage device 625. Other embodiments use a removable storage device (such as a memory card or memory stick) as the permanent storage device.

Like the permanent storage device 625, the system memory 615 is a read-and-write memory device. However, unlike storage device 625, the system memory is a volatile read-and-write memory, such as a random access memory. The system memory stores some of the instructions and data that the processor needs at runtime. In some embodiments, the invention's processes are stored in the system memory 615, the permanent storage device 625, and/or the read-only memory 620.

The bus 605 also connects to the input and output devices 630 and 635. The input devices enable the user to communicate information and select commands to the computer system. The input devices 630 include alphanumeric keyboards and cursor-controllers. The output devices 635 display images generated by the computer system. The output devices include printers and display devices, such as cathode ray tubes (CRT) or liquid crystal displays (LCD).

Finally, as shown in FIG. 6, certain configurations of the computer 600 also include a network adapter 640 that connects to the bus 605. Through the network adapter 640, the computer can be a part of a network of computers (such as a local area network ("LAN"), a wide area network ("WAN"), or an Intranet) or a network of networks (such as the Internet). Any or all of the components of computer system 600 may be used in conjunction with the invention. However, one of ordinary skill in the art will appreciate that any other system configuration may also be used in conjunction with the invention.

V. Advantages

One of ordinary skill in the art will understand that the above described integrity verification processes have several advantages. For instance, when loading new executable code on a device, it is important to verify the integrity of the code because such code provides opportune time for attacking the device. The integrity processes described above provide an easy way to check the integrity of the code even on portable devices with limited computation resources.

Also, some embodiments incorporate the integrity verification procedures during the start-up boot sequence of the device in order to minimize the possibility of tampering with the integrity procedure. To further minimize this possibility, some embodiments have the integrity processes stored on a read-only memory of the device.

While the invention has been described with reference to numerous specific details, one of ordinary skill in the art will recognize that the invention can be embodied in other specific forms without departing from the spirit of the invention. For instance, as mentioned above, some embodiments might use a keyed hashing function. If a key is used, both symmetric (single secret key) and asymmetric keys (public/private key pairs) may be used. One example of a keyed hash function is a keyed MD5 technique. Basically, a sender appends a randomly generated key to the end of a message, and then hashes the message and key combination using an MD5 hash to create a message digest. Next, the key is removed from the message and encrypted with the sender's private key. The message, message digest, and encrypted key are sent to the recipient, who opens the key with the sender's public key (thus validating that the message is actually from the sender). The recipient then appends the key to the message and runs the same hash as the sender. The message digest should match the message digest sent with the message.

Also, several embodiments described above select bit patterns in the object code format of a content. Other embodiments might select other patterns of sections when the content is in another format (e.g., is in a source code or XML format). Thus, one of ordinary skill in the art would understand that the invention is not to be limited by the foregoing illustrative details, but rather is to be defined by the appended claims.

What is claimed is:

1. A non-transitory machine readable medium storing a program which when executed by at least one processor distributes digital content, the program comprising sets of instructions for:
    selecting a portion of the digital content that is less than the entire digital content using a pseudo random selection process that pseudo-randomly selects a subset of the digital content, wherein the digital content comprises a plurality of sets of opcodes and operands;
    using the selected portion of the digital content to generate a digital signature for the entire digital content; and
    supplying the digital signature and the digital content to a device in order for the device to authenticate the digital signature by using the pseudo random selection process to select the same portion of the digital content.

2. The non-transitory machine readable medium of claim 1, wherein each set of opcodes and operands comprises a particular opcode and the operands associated with the particular opcode.

3. The non-transitory machine readable medium of claim 1, wherein the set of instructions for selecting the portion of the digital content comprises a set of instructions for selecting a subset of each of the sets of opcodes and operands using the pseudo random selection process.

4. The non-transitory machine readable medium of claim 1, wherein the set of instructions for using the selected portion of the digital content to generate the digital signature comprises a set of instructions for generating a hash from only the selected portion of the digital content.

5. A non-transitory machine readable medium storing a program which when executed by at least one processor distributes digital content, the program comprising sets of instructions for:
  selectin a portion of the digital content that is less than the entire digital content using a pseudo random selection process that pseudo-randomly selects a subset of the digital content;
  generating a hash digest by applying a hash function to only the selected portion of the digital content;
  generating a digital signature for verifying the entire digital content from the hash digest; and
  supplying the digital signature and the digital content to a device in order for the device to authenticate the digital signature by using the pseudo random selection process to select the same portion of the digital content.

6. A method for distributing digital content, the method comprising:
  identifying sets of opcodes and operands in a digital content;
  selecting a portion of the digital content using a pseudo random selection process that pseudo-randomly selects a subset of each of a plurality of the sets of opcodes and operands;
  using the selected portion of the digital content to generate a digital signature for the entire digital content; and
  supplying the digital signature and the digital content to a device in order for the device to authenticate the digital signature by using the pseudo random selection process to select the same portion of the digital content.

7. The method of claim 6, wherein each set of opcodes and operands is a line of object code in the digital content.

8. The method of claim 6, wherein using the selected portion of the digital content to generate the digital signature comprises:
  generating a hash digest by applying a hash function to only the selected portion of the digital content; and
  generating the digital signature for the entire digital content from the hash digest.

9. The method of claim 6, wherein the digital content comprises an update for firmware of the device.

10. The method of claim 6, wherein the digital content comprises an application for operation on the device.

11. The method of claim 6 further comprising receiving, prior to identifying the sets of opcodes and operands, a request for the digital content from the device.

12. The method of claim 6, wherein the selected portion comprises a pseudo-random mix of opcodes and operands.

13. A non-transitory machine readable medium storing a program which when executed by at least one processor accesses digital content, the program comprising sets of instructions for:
  receiving a digital content comprising a plurality of sets of opcodes and operands;
  receiving a digital signature for the digital content generated from a selected portion of the digital content, the portion selected by pseudo-randomly selecting a subset of each of a plurality of the sets of opcodes and operands; and
  using the same selected portion of the digital content to authenticate the digital content by verifying the digital signature.

14. The non-transitory machine readable medium of claim 13, wherein the set of instructions for using the same selected portion of the digital content to authenticate the digital content comprises a set of instructions for recomputing a digest used in the derivation of the digital signature, the recomputed digest derived from only the selected portion used to generate the digital signature.

15. The non-transitory machine readable medium of claim 14, wherein the set of instructions for using the same selected portion of the digital content to authenticate the digital content further comprises sets of instructions for:
  generating a second digital signature from the recomputed digest; and
  determining whether the generated second digital signature matches the received Digital signature.

16. The non-transitory machine readable medium of claim 15, wherein the computer program further comprises a set of instructions for indicating that the digital content has been tampered with when the digital signatures do not match.

17. The non-transitory machine readable medium of claim 14, wherein the set of instructions for using the same selected portion of the digital content to authenticate the digital content further comprises a set of instructions for ensuring that the received digital signature is appropriate for the recomputed digest.

18. The non-transitory machine readable medium of claim 13, wherein each set of opcodes and operands is a line of object code in the digital content.

19. The non-transitory machine readable medium of claim 13 further comprising a set of instructions for loading the digital content in executable memory after authenticating the digital content.

* * * * *